United States Patent [19]
Wagener

[11] Patent Number: 6,086,389
[45] Date of Patent: Jul. 11, 2000

[54] MULTI-FUNCTION ADAPTER FOR A NUMBER OF BUS BARS OF A BUS BAR SYSTEM

[75] Inventor: Hans Wagener, Dietzhölztal, Germany

[73] Assignee: Rittal-Werk Rudlof Loh GmbH & Co. KG, Herborn, Germany

[21] Appl. No.: 09/211,330

[22] Filed: Dec. 15, 1998

[30] Foreign Application Priority Data

Dec. 15, 1997 [DE] Germany .......................... 197 55 848

[51] Int. Cl.⁷ .................................................. H01R 25/00
[52] U.S. Cl. ............................................................ 439/114
[58] Field of Search .................................. 439/114, 113, 439/687, 465, 696, 731

[56] References Cited

U.S. PATENT DOCUMENTS

| | | | |
|---|---|---|---|
| 4,759,723 | 7/1988 | Siemon | 439/687 |
| 4,781,614 | 11/1988 | Ahroni | 439/696 |
| 5,199,899 | 4/1993 | Ittah | 439/687 |

FOREIGN PATENT DOCUMENTS

| | | |
|---|---|---|
| 642 197 | 8/1995 | European Pat. Off. . |
| 762 581 | 6/1996 | European Pat. Off. . |
| 762 582 | 6/1996 | European Pat. Off. . |
| 1163937 | 9/1964 | Germany . |
| 90 01 941 U1 | 6/1991 | Germany . |
| 195 15 923 | 5/1997 | Germany . |

Primary Examiner—Gary F. Paumen
Attorney, Agent, or Firm—Pauley Petersen Kinne & Fejer

[57] ABSTRACT

A multi-function adapter with a base housing, on which suspension hooks corresponding to the number of bus bars of a bus bar system are formed, which are offset with respect to each other in the longitudinal direction of the base housing in a manner corresponding to the spacing of the bus bars, and which are accessible through contact rail receptacles for the insertion of connecting contacts, which connect the inserted contact rails with the bus bars. A multiple variation of the adapter is achieved because the narrow side walls, the long lateral walls and the top of the base housing have snap-in receptacles with snap-in shoulders, by which narrow side cover elements, top cover elements, perforated strips and equipment connection elements can be selectively connected with the base housing with appropriately designed and distributed snap-in springs.

14 Claims, 6 Drawing Sheets

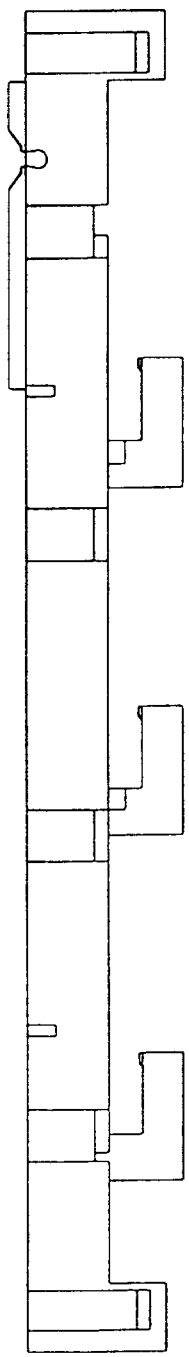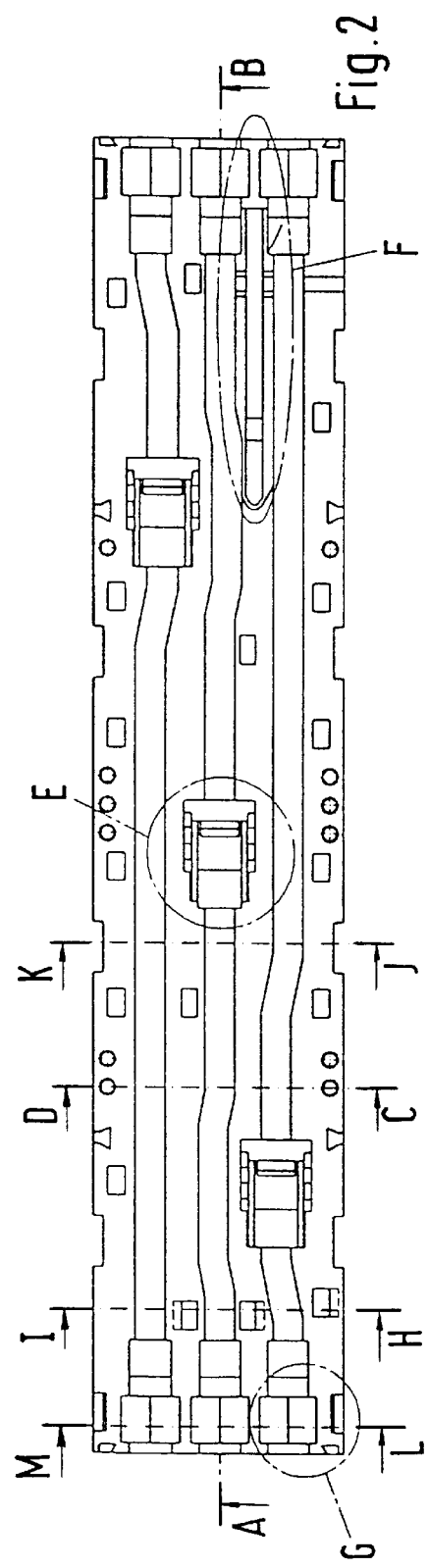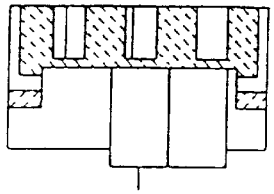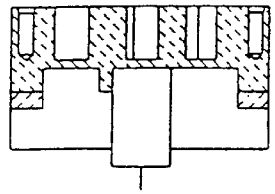

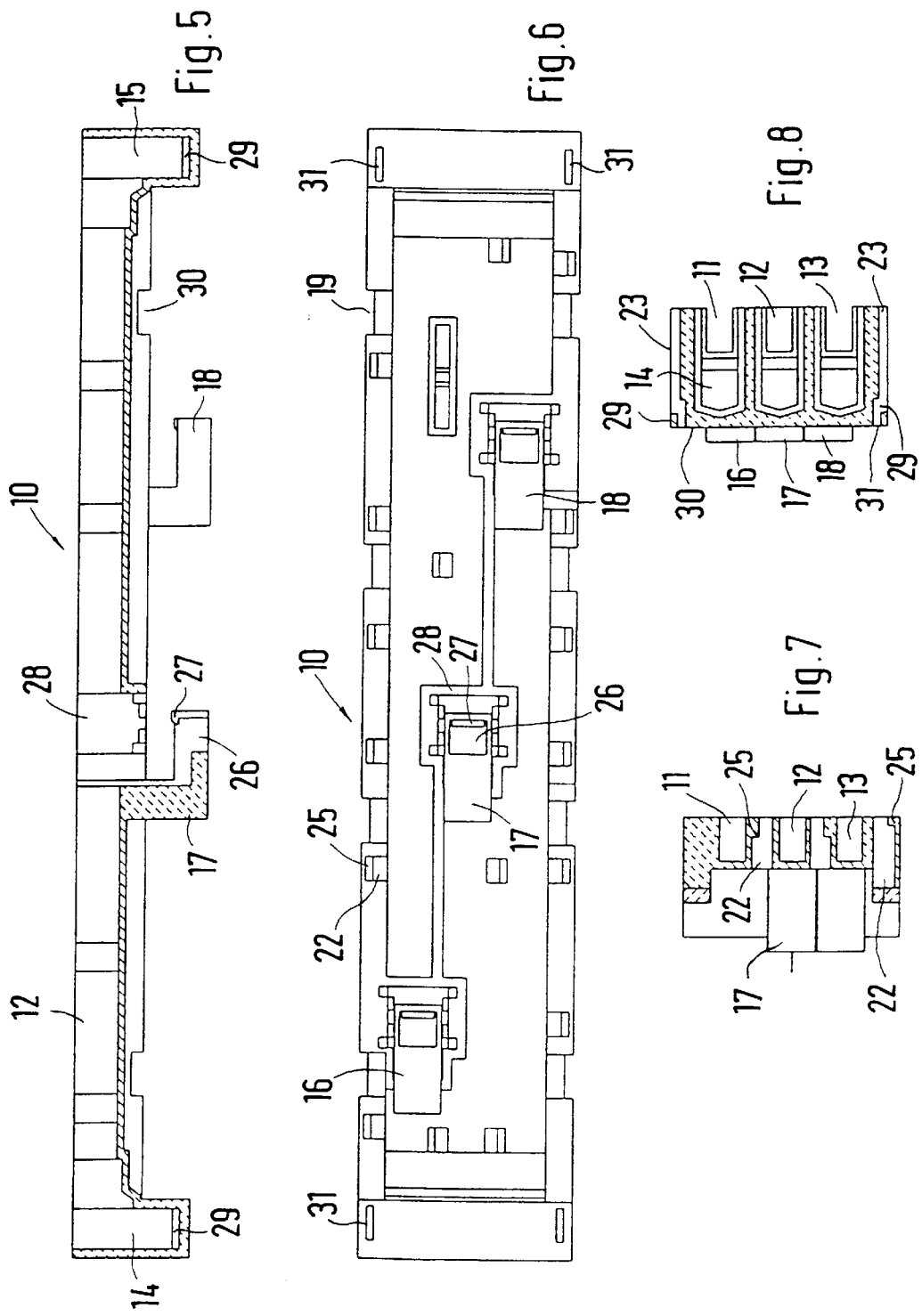

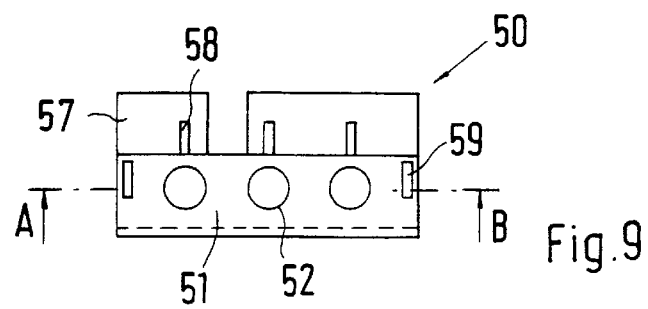
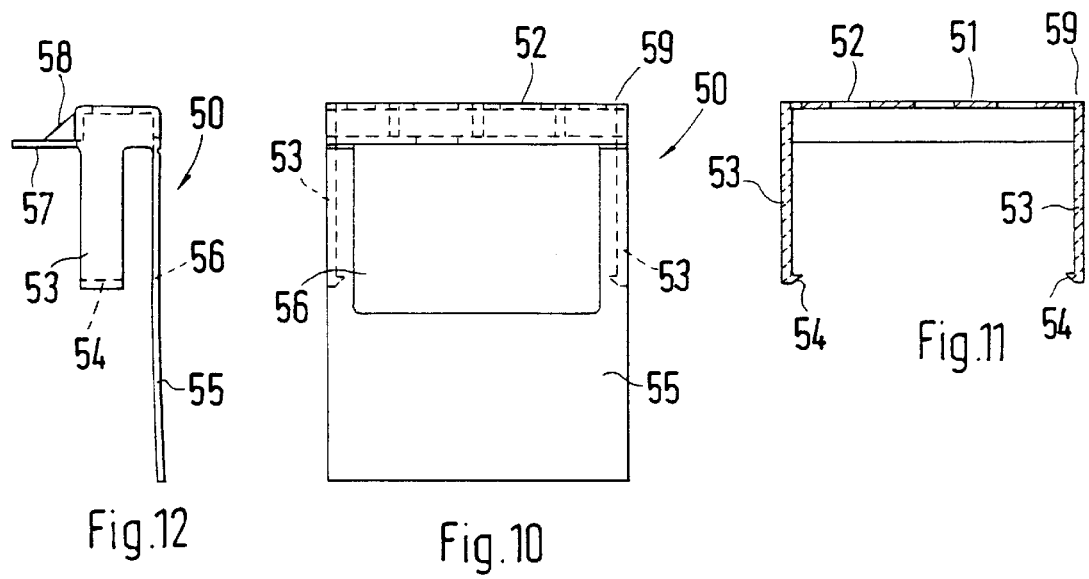
Fig. 9
Fig. 12  Fig. 10  Fig. 11

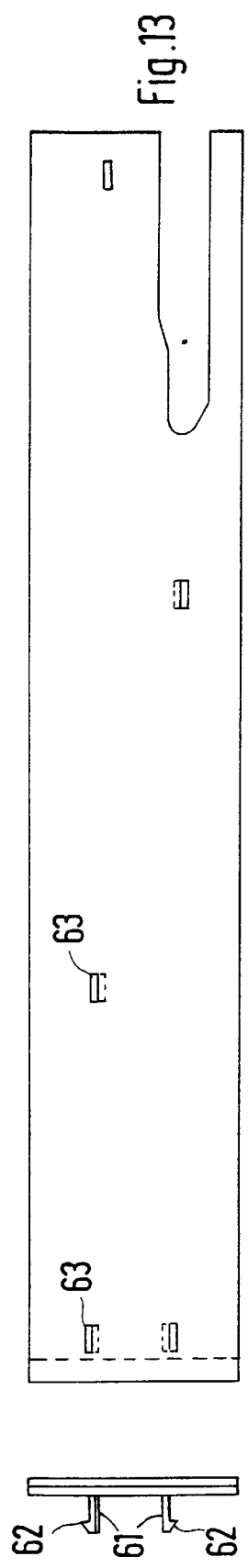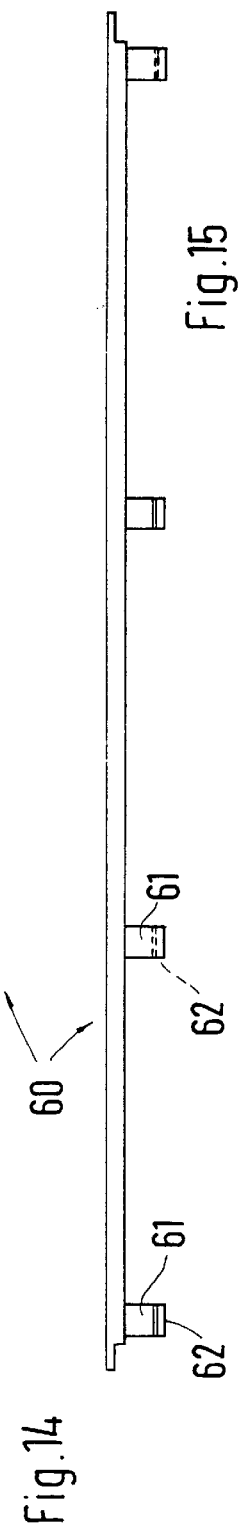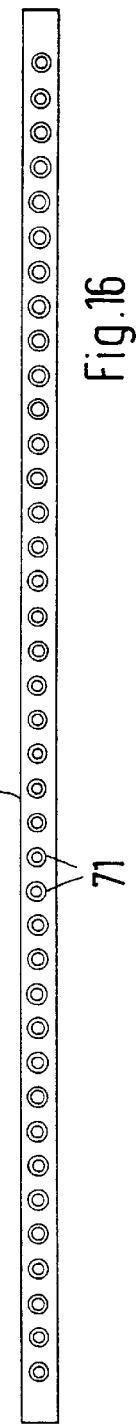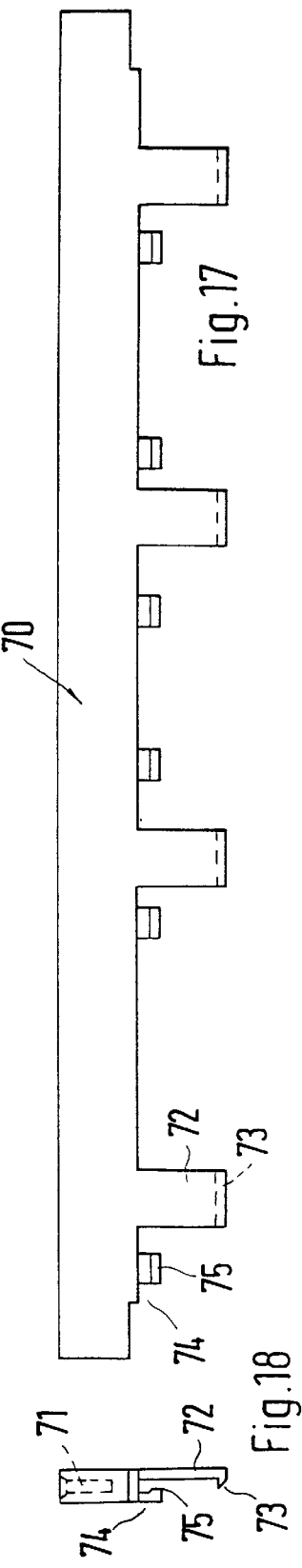

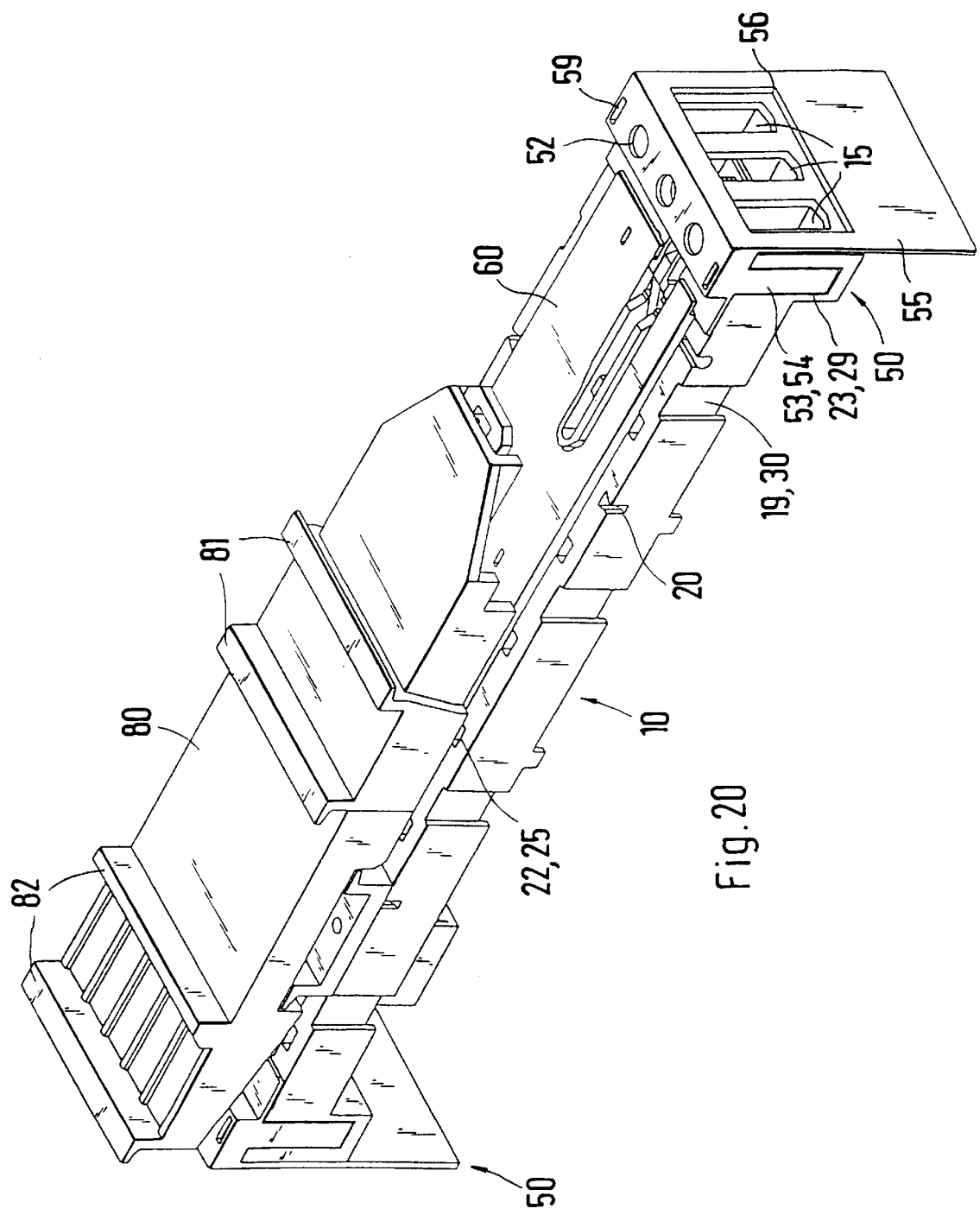

MULTI-FUNCTION ADAPTER FOR A NUMBER OF BUS BARS OF A BUS BAR SYSTEM

BACKGROUND OF THE INVENTION

1. Field of the Invention

This invention relates to a multi-function adapter with a base housing, on which suspension hooks corresponding to the number of bus bars of a bus bar system are formed, which are offset with respect to each other in a longitudinal direction of the base housing in a manner corresponding to spacing of the bus bars, and which are accessible through contact rail receptacles for insertion of connecting contacts, which connect the inserted contact rails with the bus bars.

2. Description of Prior Art

Various types of bus bar adapters are known, which are designed as power supply, connection, equipment or sequencing adapters. These known adapters have a respective base housing, which is individually designed and adapted to the intended use. This requires a considerable outlay in tools for the various base housings, which cannot yet be produced in a cost-effective manner. This is additionally more difficult because there is a plurality of different bus bar systems, which differ from each other by the number of bus bars, in their cross section and by the spacing of the bus bars.

As indicated in European Patent Publications EP 0 642 197 B 1, EP 0 762 581 A1 and EP 0 762 582 A1, bus bar adapters are also known, which are combined from a lower adapter element and an upper adapter element. The two adapter elements are connected with each other by snap-in connections. The upper adapter elements can be connected with additional upper adapter elements, so that the structural size in the longitudinal direction of the bus bar system can be expanded for further installation equipment. However, in this case the design of the adapters is always limited to equipment adapters of a very defined structure and type of fastening of the installation equipment.

SUMMARY OF THE INVENTION

It is one object of this invention to provide a multi-function adapter which can be designed for a particular bus bar system as a power supply, a connection, an equipment or sequencing adapters with a small cost of parts.

In accordance with this invention, this object is attained with narrow side walls, the long lateral walls and the top of the base housing having snap-in receptacles with snap-in shoulders, by which narrow side cover elements, top cover elements, perforated strips and equipment connection elements can be selectively connected with the base housing using appropriately designed and distributed snap-in springs.

In any case, the base housing with the plurality of distributed snap-in receptacles is used, to which the required elements, such as narrow side cover elements, top cover element, perforated strips and equipment connection elements, are attached. Here, these additional elements need only be snapped into the base housing. The elements form a kit, with which various adapters can be constructed. The elements are simply and cost-effectively produced. Assembly of the adapter can also be performed simply and rapidly by using the snap-in connection.

In accordance with an embodiment of this invention, the contact rail receptacles in the area of the suspension hooks form a snap-in receptacle, into which the connecting contact held in a contact support can be snapped. The connecting contacts can be brought into position in the suspension hooks prior to inserting the contact rails into the base body.

In a further embodiment, the contact rail receptacles terminate in the area of the narrow side walls of the base housing in contact receptacles, into which commercially available connecting contacts, which can be connected with the contact rails, can be inserted and fixed in place therein using a top cover element and/or a narrow side cover element. It is thus possible to connect on one or both the narrow side walls of the base housing by designing the contact rails and equipping the contact receptacles.

If the design has a row of snap-in receptacles with snap-in shoulders, designed as vertically aligned plug receptacles, formed in the top of the base housing along its longitudinal sides, it is possible to fix perforated strips for pluggable slip-on elements for switchgear, such as shown, for example in German Patent Publication DE 90 01 941 U1. However, the slip-on elements can also be attached directly to the base housing if additional rows of perforations for plugging in slip-on parts, known per se, for switchgear are cut along the top of the long lateral walls of the base housing.

If the snap-in receptacles are embodied as vertical plug receptacles, cut into the top of the wall elements forming the boundaries of the contact rail receptacles, it is then possible to attach additional elements in this area of the top of the base housing.

In accordance with one embodiment, for fastening the perforated strips to the base housing, the perforated strips have first snap-in springs formed on undersides, which are matched to and aligned with snap-in receptacles cut along longitudinal sides of the base housing. Here, seating of the perforated strips is considerably improved because the perforated strips end flush with the outside of the long lateral walls of the base housing and additionally have second snap-in springs, which can be snapped into snap-in receptacles in the form of receiving grooves in the long lateral walls. The first snap-in springs and the second snap-in springs end flush with the exterior longitudinal sides of the perforated strips and face each other with snap-in shoulders.

The top cover elements and the equipment connection elements are preferably fastened in such a way, that the top cover elements and the equipment connection elements have snap-in springs formed and distributed on their undersides, which are adapted to and aligned with at least a part of the snap-in receptacles which are cut into the top of the wall elements of the base housing delimiting the contact rail receptacles, while leaving free the snap-in receptacles cut along the long lateral walls. It is thus possible to also attach perforated strips on the base housing.

In accordance with an embodiment, for covering the narrow side walls, the narrow side cover elements have a cover plate with a cut out window to the contact receptacles of the base housing. A cover plate with openings to the contact receptacles is formed on the cover plate. The snap-in springs of the narrow side cover elements can be snapped into snap-in receptacles designed as outside grooves with a snap-in shoulder. Therefore the narrow side cover elements keep the access to the contact receptacles of the base housing open with the cut-out window. However, in place of the end cover element, it is also possible to attach a differently designed narrow side cover element to the base housing, provided the latter has correspondingly matched and distributed snap-in springs. It is selectively possible to provide one or both narrow side walls with a small side wall cover element.

In a further embodiment, the outside of the long side wall and the narrow side walls of the base housing have vertical dove-tailed grooves, by means of which additional adapters or other cover elements can be lined up on or attached to the base housing. It is then also possible to line up additional elements on the long side walls.

The equipment connection elements can have slip-on elements matched to defined types of switchgear, which can also be formed on them in one piece.

BRIEF DESCRIPTION OF THE DRAWINGS

This invention will be explained in greater detail by means of an exemplary embodiment represented in the drawings, wherein:

FIG. 1 is a plan view of a long side wall of a base housing in accordance with this invention;

FIG. 2 is a top view from above a top of the base housing as shown in FIG. 1;

FIG. 3 is a cross-sectional view taken through the base housing along the line C–D as shown in FIG. 2;

FIG. 4 is a cross-sectional view taken through the base housing along the line J–K as shown in FIG. 2;

FIG. 5 is a cross-sectional view taken through the base housing along the line A–B as shown in FIG. 2;

FIG. 6 is a bottom view of an underside of the base housing as shown in FIG. 1;

FIG. 7 is a cross-sectional view taken through the base housing along the line H–I as shown in FIG. 2;

FIG. 8 is a cross-sectional view taken through the base housing along the line L–M as shown in FIG. 2;

FIG. 9 is a top view of a narrow side cover element;

FIG. 10 is a front view of the narrow side cover element as shown in FIG. 9;

FIG. 11 is a cross-sectional view taken through the narrow side cover element along the line A–B as shown in FIG. 9;

FIG. 12 is a side view of the narrow side cover element as shown in FIG. 9;

FIG. 13 is a top view of a top cover element;

FIG. 14 is a view of a narrow side of the top cover element as shown in FIG. 13;

FIG. 15 is a side view of the longitudinal side of the top cover element as shown in FIG. 13;

FIG. 16 is a top view of a perforated strip;

FIG. 17 is a side view of the longitudinal side of the perforated strip as shown in FIG. 16;

FIG. 18 is a view of a narrow side of the perforated strip as shown in FIG. 16;

FIG. 20 is a perspective view of a different embodiment of an equipment adapter constructed of a base housing, a top cover element, an equipment connection element and two narrow side cover elements.

DESCRIPTION OF PREFERRED EMBODIMENTS

Figure 19:
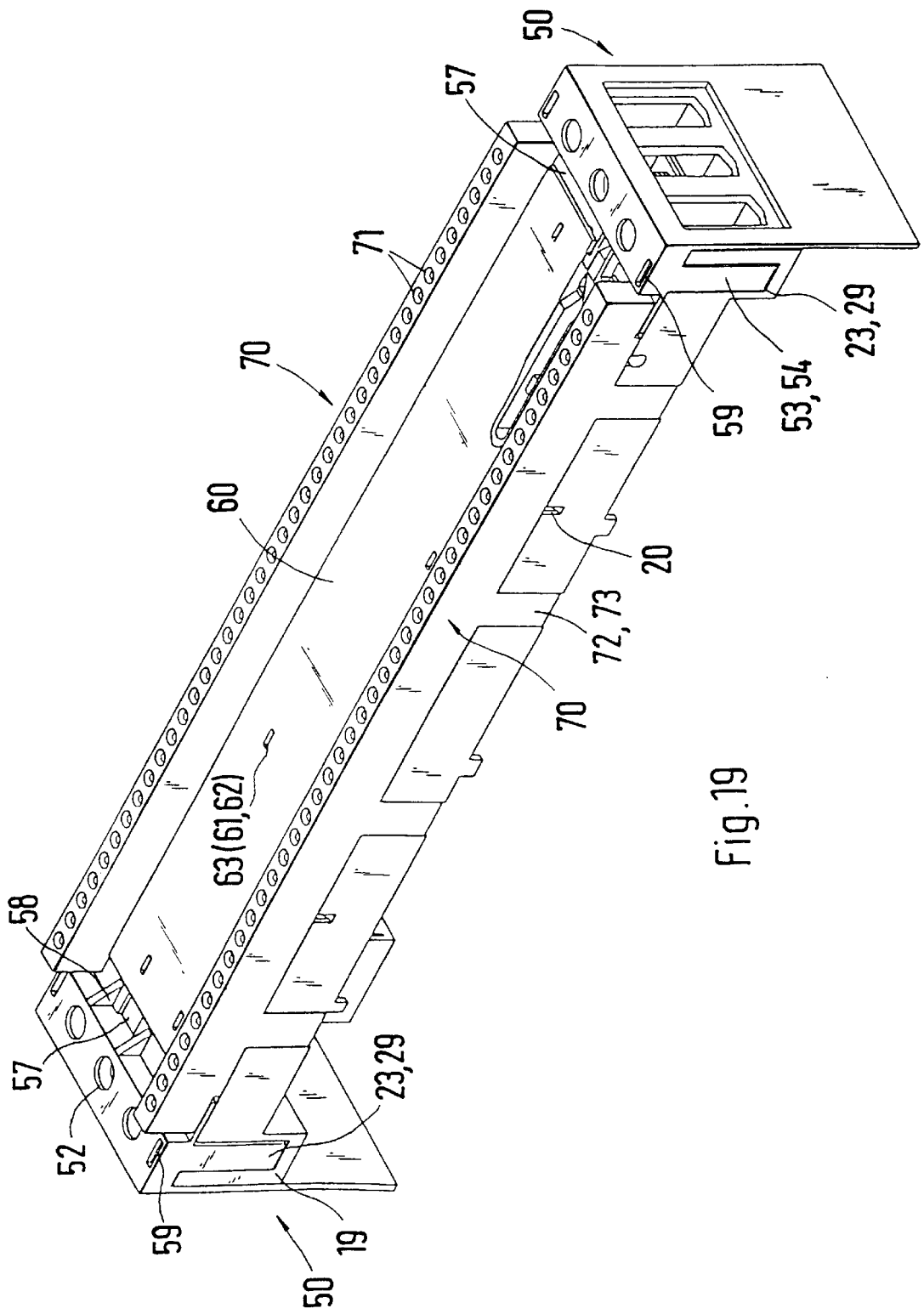
FIG. 19 is a perspective view of an equipment adapter constructed of a base housing, two perforated strips, a top cover element and two narrow side cover elements.

The multi-function adapter in accordance with this invention can be produced in different designs. A base housing 10 in accordance with FIGS. 1 to 8, together with the narrow side cover elements 50 in accordance with FIGS. 9 to 12, the top cover elements in accordance with FIGS. 13 to 15, commercially available equipment connection elements, such as can be found in FIG. 20, and commercially available slip-on elements and switching elements constitutes a type of a kit, with which it is possible in a simple manner to put together very different types of adapters using snap-in connectors alone.

The base housing 10 is produced as a one-piece injection-molded plastic element, wherein the suspension hooks 16, 17 and 18 are formed on the base housing 10 in one piece and offset in the longitudinal direction of the base housing 10 spaced apart at the distance of the bus bars of the bus bar system. In one exemplary embodiment, three contact rail receptacles 11, 12 and 13 in the shape of grooves are formed in the top of the base housing 10 and are widened in the area of the suspension hooks 16, 17 and 18 to form snap-in receptacles 28 for snapping in a connecting contact fixed in place in a contact support. The suspension hooks 16, 17 and 18 form a receptacle for the connecting contact, which is additionally held by means of the holding shoulder 27. So that the holding shoulder 27 can be easily released, an opening 26 is cut into a suspension hook, for example the suspension hook 17.

The contact rail receptacles 11, 12 and 13 extend up to both narrow side walls of the base housing 10 and there form contact receptacles 14 and 15 for commercially available terminal contacts.

Snap-in receptacles 22 in the form of plug-in receptacles, and a snap-in shoulder 25 are cut into the top of the base housing 10, which can be particularly easily seen in the sectional view of FIG. 7. The snap-in receptacles 22 are open at the bottom, so that the snap-in shoulder 25 can be easily released. Here, a row of the snap-in receptacles 22 is cut in a different and reversed sequence along the long lateral walls of the base housing 10, wherein the snap-in shoulder 25 of the snap-in receptacles of both longitudinal sides face each other. In addition, vertical receptacle grooves 19 are formed in the outsides of the long lateral walls of the base housing 10, which make transitions into snap-in receptacles 30, as shown in the sectional view in FIG. 4.

It is possible by means of these snap-in receptacles 22 and the receptacle grooves 19 along the longitudinal sides of the base housing 10 to attach perforated strips 70 in accordance with FIGS. 16 to 18 to the base housing 10. The perforated strips 70 have on their longitudinal sides snap-in springs 72, 74 corresponding to the distribution of the snap-in receptacles 22 and the receptacle grooves 19, which end flush with the longitudinal sides of the perforated strips 70. Facing snap-in shoulders 73 and 75 are supported on the snap-in springs 72 and 74, which are distributed and matched to the snap-in shoulder 25 of the snap-in receptacles 22 and the snap-in receptacles 30 of the receptacle grooves 19 in such a way, that the perforated strips 70 can be vertically snapped on the base housing 10, wherein the perforated strips 70 then terminate flush with the long lateral walls of the base housing 10, as represented in FIG. 19. Perforations 71 are cut at uniform distances into the tops of the perforated strips 70, which can receive plug-in pins of commercially available slip-on elements.

On their tops, the wall elements of the base housing 10 delimiting the contact rail receptacles 11, 12 and 13 have further snap-in receptacles 22, designed as plug-in receptacles, with snap-in shoulders 25, so that the top cover elements 60 in accordance with FIGS. 13 to 15 can be snapped onto the base housing 10. Thus, snap-in springs 61 with snap-in shoulders 62 are formed on an underside of the top cover element 60, which are adapted to and aligned with these additional snap-in receptacles 22 with the snap-in shoulders 62. In this case the snap-in receptacles 22 arranged along the longitudinal sides remain free for the application of the perforated strips 70, so that the latter can be selectively attached. The contact rails are held in the contact rail receptacles 11, 12 and 13 by means of the top cover element 60 and are covered secure against touching, as shown in FIG. 20. An equipment connection element 80, such as is commercially available, can be snapped onto the top cover element 60, or fastened in some other way, which is already matched to preselected switchgear by means of the formed-on slip-on elements 81 and 82.

The long and the narrow side walls of the base housing 10 additionally have dovetailed grooves 20 and 24, so that further adapters or additional devices can be attached to all sides of the base housing 10, such as shown in FIG. 2.

Vertical receptacle grooves 23 are formed on the end of the long lateral walls of the base housing 10, which constitute a snap-in receptacle 29 on the underside of the base housing 10, so that the narrow side cover elements 50 in accordance with FIGS. 9 to 12 can be vertically snapped in position. For easy removal, the snap-in receptacles 29 are open in a direction toward the underside of the base housing 10. The narrow side cover elements 50 have a cover plate 55 with a cut-out window 56, which leaves access to the contact receptacles 14, or respectively 15, of the base housing 10 open. A cover plate 51 with openings 52 is formed in the area of the top on the cover plate 55, which extends at right angles with respect to the top.

Access to the terminal contacts in the contact receptacles 14 and 15 is available through the openings 52. The narrow side cover element 50 has snap-in springs 53 with snap-in shoulders 54 in the area of the long lateral walls, which are snapped into the snap-in receptacles 29 of the base housing 10. The snap-in springs 53 then terminate in the receptacle grooves 23 flush with the long lateral walls of the base housing 10. The cover plate 51 has openings 59, which make the release of the snap-in shoulders 54 easier. A divided connecting plate 57, which is reinforced by means of strips 58, adjoins the cover plate 51.

Such narrow side cover elements 50 can either be snapped into only one or into both narrow side walls of the base housing 10. As shown by the example of two different equipment adapters in FIGS. 19 and 20, a multitude of different adapters can be assembled from the uniform base housing 10 in connection with the narrow side cover elements 50, the top cover elements 60, the perforated strips 70 and commercially available equipment connection elements 80, wherein these elements are held together solely by means of snap-in connections.

What is claimed is:

1. In a multi-function adapter having a base housing forming a plurality of suspension hooks corresponding to a number of bus bars of a bus bar system which are offset with respect to each other in a longitudinal direction of the base housing in a manner corresponding to a spacing of the bus bars, and which are accessible through a plurality of contact rail receptacles in which are inserted a plurality of connecting contacts which connect a plurality of inserted contact rails with the bus bars, the improvement comprising:

a plurality of narrow side walls, a plurality of elongated lateral walls and a top of the base housing (10) having a plurality of snap-in receptacles (19, 30, 22, 25, 23, 29) each with a snap-in shoulder, one of a plurality of narrow side cover elements (50), a plurality of top cover elements (60), a plurality of perforated strips (70) and a plurality of equipment connection elements (80) having a plurality of snap-in springs (53, 54, 61, 62, 72, 73, 74, 75) engageable within the snap-in receptacles (19, 30, 22, 25, 23, 29) to connect the base housing (10) with the one of the narrow side cover elements (50), the top cover elements (60), the perforated strips (70) and the equipment connection elements (80), wherein each of the narrow side cover elements (50) has a cover plate (55) with a cut out window (56) providing access to a plurality of contact receptacles (14, 15) of the base housing (10).

2. In the multi-function adapter in accordance with claim 1, wherein the contact rail receptacles (11, 12, 13) in an area of the suspension hooks (16, 17, 18) form a snap-in receptacle (28) into which one of the connecting contacts held in a contact support can be snapped.

3. In the multi-function adapter in accordance with claim 2, wherein the contact rail receptacles (11, 12, 13) terminate in an area of the narrow side walls of the base housing (10) in the contact receptacles (14, 15), into which the connecting contacts, which can be connected with the contact rails, can be inserted and fixed in place by at least one of one of the top cover elements (60) and one of the narrow side cover elements (50).

4. (Amended) In the multi-function adapter in accordance with claim 3, wherein a row of the snap-in receptacles (22) with snap-in shoulders (25) designed as vertically aligned plug receptacles is formed in a housing top of the base housing (10) along longitudinal sides of the base housing (10).

5. (Amended) In the multi-function adapter in accordance with claim 4, wherein the snap-in receptacles (22, 25) are distributed and cut into a wall top of wall elements of the base housing (10) forming boundaries of the contact rail receptacles (11, 12, 13).

6. In the multi-function adapter in accordance with claim 4, wherein the perforated strips (70) have first springs of the snap-in springs (72, 73) formed on undersides which are matched to and aligned with the snap-in receptacles (22, 25) cut along the longitudinal sides of the base housing (10).

7. In the multi-function adapter in accordance with claim 6, wherein the perforated strips (70) end flush with an outside of the elongated lateral walls of the base housing (10) and have second springs of the snap-in springs (73, 74), which can be snapped into the snap-in receptacles (19, 30) formed as receiving grooves in the elongated lateral walls, wherein the first springs of the snap-in springs (72, 73) and the second springs of the snap-in springs (73, 74) end flush with an exterior longitudinal side of the perforated strips (70) and face each other with snap-in shoulders (72, 75).

8. In the multi-function adapter in accordance with claim 7, wherein the top cover elements (60) and the equipment connection elements (80) have the snap-in springs (61, 62) formed and distributed on undersides which are adapted to and aligned with at least a part of the snap-in receptacles (22, 25), which are cut into the top of the wall elements of the base housing (10) delimiting the contact rail receptacles (11, 12, 13) while leaving free the snap-in receptacles (22, 25) cut along the elongated lateral walls.

9. In the multi-function adapter in accordance with claim 1, wherein the contact rail receptacles (11, 12, 13) terminate in an area of the narrow side walls of the base housing (10) in the contact receptacles (14, 15), into which the connecting contacts, which can be connected with the contact rails, can be inserted and fixed in place by at least one of a top cover element (60) and one of the narrow side cover elements (50).

10. In the multi-function adapter in accordance with claim 1, wherein a row of the snap-in receptacles (22) with snap-in shoulders (25) designed as vertically aligned plug receptacles is formed in a housing top of the base housing (10) along longitudinal sides of the base housing (10).

11. In the multi-function adapter in accordance with claim 1, wherein the snap-in receptacles (22, 25) embodied as vertical plug receptacles are distributed and cut into a wall top of the wall elements of the base housing (10) forming boundaries of the contact rail receptacles (11, 12, 13).

12. In the multi-function adapter in accordance with claim 10, wherein the perforated strips (70) have first springs of the snap-in springs (72, 73) formed on undersides which are matched to and aligned with the snap-in receptacles (22, 25) cut along the longitudinal sides of the base housing (10).

13. In the multi-function adapter in accordance with claim 10, wherein the perforated strips (70) end flush with an outside of the elongated lateral walls of the base housing (10) and have second springs of the snap-in springs (73, 74), which can be snapped into the snap-in receptacles (19, 30) formed as receiving grooves in the elongated lateral walls, wherein the first springs of the snap-in springs (72, 73) and the second springs of the snap-in springs (73, 74) end flush with an exterior longitudinal side of the perforated strips (70) and face each other with snap-in shoulders (72, 75).

14. In the multi-function adapter in accordance with claim 1, wherein the top cover elements (60) and the equipment connection elements (80) have the snap-in springs (61, 62) formed and distributed on undersides which are adapted to and aligned with at least a part of the snap-in receptacles (22, 25), which are cut into the top of the wall elements of the base housing (10) delimiting the contact rail receptacles (11, 12, 13) while leaving free the snap-in receptacles (22, 25) cut along the elongated lateral walls.

\* \* \* \* \*